UNITED STATES PATENT OFFICE.

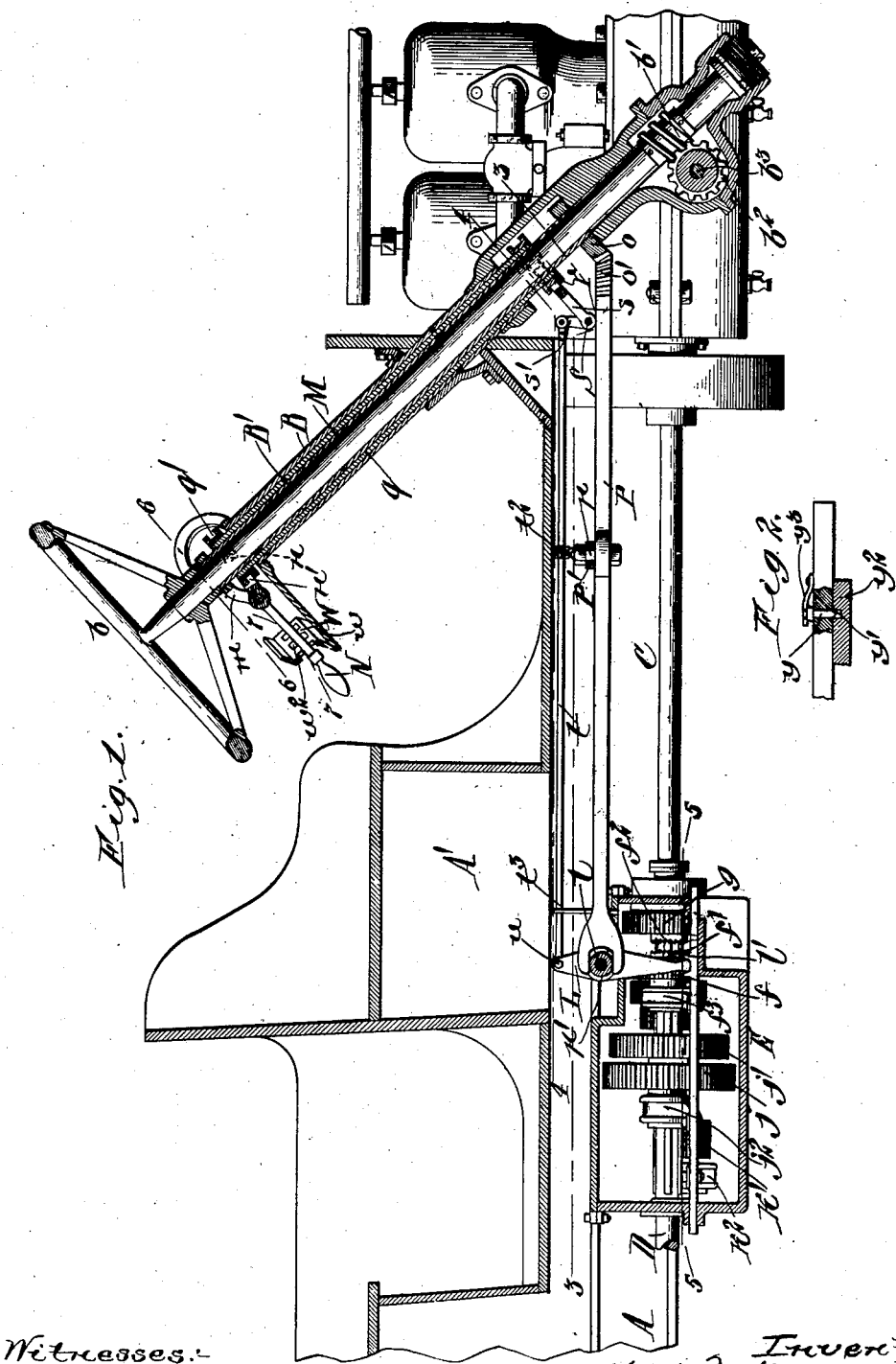

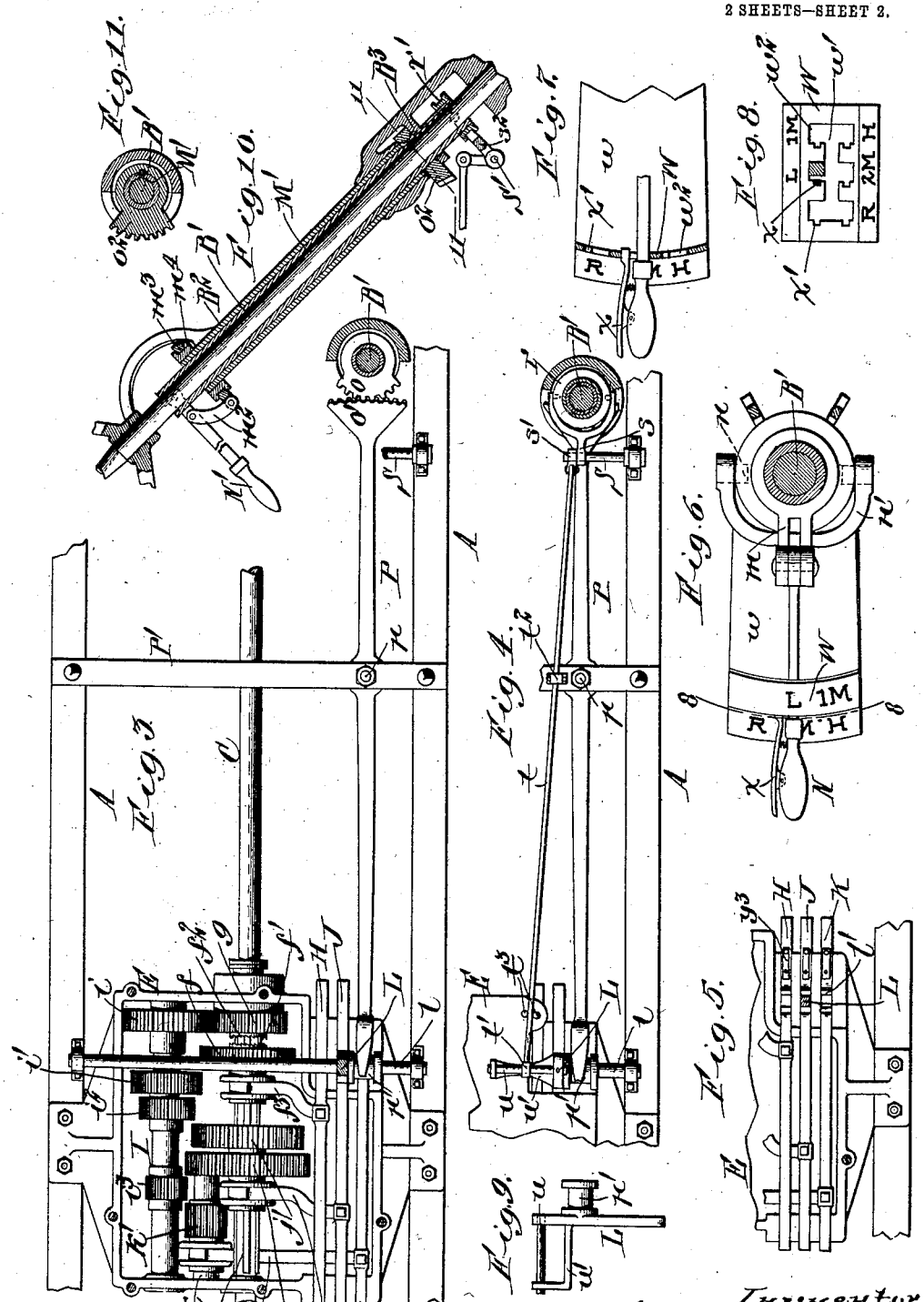

ALBERT F. KRAUSE, OF BUFFALO, NEW YORK, ASSIGNOR OF ONE-HALF TO CHARLES C. LADD, OF BUFFALO, NEW YORK.

CONTROLLING DEVICE FOR TRANSMISSION-GEARS.

931,770.

Specification of Letters Patent. Patented Aug. 24, 1909.

Application filed April 10, 1908. Serial No. 426,181.

*To all whom it may concern:*

Be it known that I, ALBERT F. KRAUSE, a citizen of the United States, residing at Buffalo, in the county of Erie and State of New York, have invented a new and useful Improvement in Controlling Devices for Transmission-Gears, of which the following is a specification.

This invention relates to the controlling levers or devices employed on automobiles for shifting the gears of the transmission or changeable speed-gear, the invention having more particular reference to a controlling device for transmissions of the selective sliding-gear type.

The object of my invention is the provision of a simple and convenient shifting device of this character which is applicable to the steering post or column adjacent to the usual steering wheel, thus enabling the transmission to be controlled more conveniently than by a lever or other device located at one side of the automobile.

In the accompanying drawings consisting of 2 sheets: Figure 1 is a fragmentary longitudinal section of an automobile embodying the invention. Fig. 2 is a fragmentary longitudinal section of one of the shifting bars of the transmission, showing the catch for locking it in its normal position. Fig. 3 is a sectional top plan view of the transmission and controlling devices, the plane of the sectional portion being in line 3—3, Fig. 1. Fig. 4 is a similar view, the plane of the section being in line 4—4, Fig. 1. Fig. 5 is a fragmentary horizontal section in line 5—5, Fig. 1. Figs. 6 and 7 are transverse sections of the steering gear in lines 6—6 and 7—7, Fig. 1. Fig. 8 is a section in line 8—8, Fig. 6. Fig. 9 is a rear view of the actuating lever of the transmission shifting bars. Fig. 10 is a longitudinal section of the steering gear, showing a modified construction of the transmission and controlling devices. Fig. 11 is a transverse section in line 11—11, Fig. 10.

Similar letters of reference indicate corresponding parts throughout the several figures.

A indicates the frame and $A^1$ the body of the automobile.

B indicates a post or support consisting preferably of the inclined tubular steering post or column rigidly secured to the body in any suitable manner, and $B^1$ indicates the steering shaft journaled in the post and provided at its upper end with the usual hand-wheel $b$. Motion may be transmitted from this shaft to the shifting connections of the front or steering wheels by any suitable means, that shown in the drawings including the usual worm $b^1$ secured to the steering shaft and meshing with a worm wheel $b^2$ secured to a transverse shaft $b^3$ from which motion is imparted to the steering wheels.

C indicates the main driving or engine shaft, and D the main shaft of the transmission or changeable speed gear from which the rear axle of the vehicle may be driven by any suitable or well-known gearing, not shown in the drawings. The transmission itself forms no part of my invention, but is preferably of the selective, sliding gear type. That shown in the drawings by way of example is constructed as follows:—

The main transmission shaft D is journaled in the case E in line with the driving shaft C and carries the sliding first-medium-speed gear $f$ which is keyed thereto and carries one member $f^1$ of a clutch, the other member $f^2$ of which is secured to a gear pinion $g$ rigidly secured to the main driving shaft C, so that when the gear $f$ is clutched to the gear $g$ the car is driven at the highest speed directly from the engine shaft C. This sliding gear has a grooved collar which is engaged by a fork $f^3$ carried by the high speed and first-medium speed shifting bar H.

I is a countershaft journaled in the transmission case E and carrying a gear wheel $i$ which meshes constantly with the gear wheel $g$ of the main shaft C. This countershaft carries different sized non-slidable pinions $i^1, i^2, i^3$, the pinion $i^1$ being adapted to mesh with the gear $f$ and the pinions $i^2$ and $i^3$ being adapted to mesh respectively with a pair of gears $j^1, j$ slidably mounted on the shaft D. The two gears $j, j^1$ are connected to slide together and are shifted by a fork $j^2$ engaging a collar of said gears and secured to the low-speed and second-medium speed shifting bar J. Upon shifting this bar to the right, the gear $j^1$ engages with the pinion $i^2$, giving the second medium speed, while upon shifting said bar to the left, the gear $j$ engages with the pinion $i^3$, giving the lowest speed. When the bar H is shifted to the right, the transmission shaft D is clutched to the main driving shaft C, giving the highest speed, while upon shifting said bar to the left, the gear $f$ engages with the pinion $i^1$, giving the first-medium speed.

$k$ indicates a second countershaft supported in the transmission case and carrying a wide slidable pinion $k^1$ adapted to be shifted into engagement with both the large gear $j$ and the pinion $i^3$, when the gear $j$ is in position shown in the drawing, for reversing the motion of the rear axle and backing the car. The shifting fork $k^2$ of this reverse gear is secured to the shifting or reverse bar K. The three shifting bars H, J and K are arranged side by side lengthwise of the car in a manner common to this type of transmissions and are suitably guided in the transmission case.

L is a shifting or actuating member adapted to engage with any one of the several shifting bars H, J and K of the transmission and shift the same longitudinally in one or both directions for driving the vehicle at the desired speed or backing it. This actuating member preferably consists of an upright rock lever swinging lengthwise of the shifting bars and fulcrumed upon a transverse rod or pivot $l$ supported on the frame of the vehicle and preferably extending across the top of the transmission case, as shown. This lever is capable of sliding laterally on its pivot rod $l$, so that it may be brought in line with any one of the shifting bars H, J, K, each of which is provided with a pair of transverse lugs $l^1$ between which the lower end of the lever is adapted to engage, so that upon swinging the lever on its pivot, the shifting bar with which it engages is reciprocated in one or the other direction. This lever is shifted and actuated by the following mechanism:

M is a hollow rotary shaft or tube surrounding the steering shaft $B^1$ and extending a short distance above and below the stationary post B. To the upper projecting end of this tube is rigidly secured a bifurcated arm or bracket $m$ to which is pivoted a vertically-swinging controlling lever N which also serves as a handle for rotating the tube M in the steering post. At its lower end, said tube is provided with a gear segment $o$ which meshes with a corresponding segment $o^1$ arranged at the front end of a horizontally-swinging lever P pivoted at $p$ to a cross bar $P^1$ of the main frame. At its rear end the lever P is provided with a fork which embraces the grooved hub $p^1$ of the laterally-sliding lever L. The tubular shaft M, while free to rotate is suitably held against longitudinal movement in the post B.

$q$ indicates a second hollow shaft or tube interposed between the post B and the hollow shaft M and capable of sliding lengthwise in the post. This slidable tube is provided at its upper end with an annularly grooved collar $q^1$ with which engage the pins $n$ of a fork or yoke $n^1$ forming the inner arm of the operating lever N, by which construction the sliding tube $q$ is reciprocated in the steering post upon swinging said lever up or down on the bracket $m$. The sliding tube $q$ extends beyond the lower end of the steering post B and to this projecting end is secured an annularly-grooved collar $r$.

S indicates a transverse rock shaft journaled on the main frame A on the rear side of the steering post, preferably above the lever P, and carrying a rock or elbow lever, the front arm $s$ of which engages the grooved collar $r$, while its rear arm $s^1$ is connected with the upper arm of the actuating lever L by a rod $t$. By this construction, the lever L is rocked on its pivot upon sliding the tube $q$ up or down in the steering post by means of the hand lever N. In the preferred construction shown in the drawings, the shiftable lever L is provided at its upper end with an extended transverse pin $u$ which is secured at one end to the lever and at its opposite end to a bracket $u^1$ projecting from the side of the lever. This pin passes loosely through an eye $t^1$ at the front end of the rod $t$, so as to slide freely in said eye when the lever is shifted laterally to bring it in line with the desired shifting bar H, J or K of the transmission. The connecting rod $t$ while free to move lengthwise is held against lateral displacement by a suitable guide $t^2$ carried by the cross bar $P^1$ and guide pins $t^3$ arranged on opposite sides of the rear portion of the rod and projecting from the top of the transmission case.

Any suitable means may be employed for predetermining the various positions of the operating lever N and locking it in place. The device preferred for this purpose consists of a segment W carried by a bracket $w$ secured to the upper end of the steering post. This segment is provided with a horizontal slot $w^1$ through which the operating lever passes, and in the upper and lower edges of this slot are formed pairs of main locking notches $w^2$ in any one of which the lever is adapted to engage. These various notches correspond to the positions of the shifting bars H, J and K of the transmission, a pair of upper and lower notches being formed in the segment for each of said bars and the notches being designated by appropriate marks or letters, as shown. The lever is provided at one side with a spring catch $x$ and each of the main notches of the segment W is provided in one side with an auxiliary locking notch $x^1$ adapted to receive said catch.

The shifting bars H, J and K are preferably provided with suitable means for locking them in their normal position in which their shifting lugs $l^1$ are in alinement, as shown in Fig. 5. In the construction shown in the drawings, each of the bars is provided with a vertically spring-pressed locking pin or catch $y$ guided in a hole therein and adapted to interlock with a socket $y^1$ in a flange $y^2$ of the transmission case. The spring $y^3$ of this pin bears upon its upper end and is secured to the shifting bar.
The operation of the transmission controlling device is as follows: In the position of the parts shown in the drawings, the clutch member $f^1$ of the main transmission shaft D is out of engagement with the clutch member $f^2$ of the driving shaft C and no motion is transmitted from the last-named shaft to the rear axle of the vehicle. If it is desired to drive the car at a given speed, the hand lever N is first swung laterally in the slot $w^1$ of the segment W and brought opposite the notch $w^2$ corresponding to the desired speed, after which the lever is swung vertically, either up or down, into said notch. By the first or lateral movement of the hand lever, the inner hollow shaft M is turned in the steering post and this movement is transmitted to the horizontally-swinging lever P which in turn shifts the actuating lever L laterally into engagement with the shifting lugs $l^1$ of the corresponding shifting bar H, J or K of the transmission, thus selecting the bar which furnishes the desired speed. By the second or vertical movement of the hand lever N, the outer hollow shaft $q$ is slid lengthwise in the steering post. By this movement, the shaft S is rocked through the medium of the grooved collar $r$ and the arm $s$, and the actuating lever L is in turn rocked on its pivot to move the corresponding shifting bar in the proper direction to give the required speed. Both of these movements of the actuating lever L are effected by swinging a single hand lever in different planes, and as this lever is mounted on the steering gear immediately below the steering wheel, the transmission can be conveniently controlled. At the same time the construction of the connections between said operating lever and the actuating lever L of the transmission are compact and do not detract from the neat appearance of the steering gear and their construction is so simple as not to add materially to the cost of the car.
The hollow shafts or tubes M and $q$, although surrounding the steering shaft $B^1$, have no connection therewith and in no way interfere with its operation.
Instead of effecting the selective and swinging movements of the actuating lever L by means of two tubular members in the steering post, the one rotatable and the other slidable, the same result may be attained by the use of a single member having a combined rotary and sliding motion in the post.

Such a modified construction of the device is illustrated in Figs. 10 and 11 where $M^1$ indicates a tubular shaft surrounding the steering shaft $B^1$ and capable of sliding as well as rotating in the steering post $B^2$. In this case, the tubular shaft extends some distance below the steering post and passes through a lug or bracket $B^3$ arranged a short distance below the lower end of the post. Upon the portion of said shaft between the post and said lug is splined a gear segment $o^2$ adapted to mesh with a corresponding segment on the end of a lever similar to the lever P of the first described construction. The tubular shaft is free to slide through the bore of said segment and carries at its lower end a grooved collar $r^1$ which corresponds to the collar $r$ of the first described construction and with which the arm $s^2$ of the rock shaft $S^1$ engages, whereby the lever L of the transmission shifting-bars is swung on its pivot, as in the construction first described. In this modified arrangement, the hand lever $N^1$ is pivoted at its front end to the projecting upper end of the tubular shaft $M^1$ and fulcrumed upon a link or standard $m^2$ pivoted at its lower end to a supporting ring $m^3$ which is loosely seated in an annular groove formed in a collar $m^4$ rigidly secured to the upper end of the steering post. It will now be understood that upon swinging the hand lever $N^1$ laterally, the hollow shaft $M^1$ is turned in the steering post and the actuating lever L is properly positioned over the desired shifting bar H, J or K, while upon swinging said hand lever vertically, the hollow shaft is slid in the steering post and the lever L rocked on its pivot, moving the shifting bar lengthwise, as hereinbefore described in connection with the first embodiment of the invention. It will be noted that in moving the hand lever laterally, the ring $m^3$ rotates on the grooved collar $m^4$ thus forming a rotary support for the lever, while during the vertical movements of the lever said ring remains at rest and the lever swings on the fulcrum at the upper end of the link $m^2$.
It will be observed that in both embodiments of the invention herein shown and described, the rotary gear-segment $o$ or $o^2$ and the slidable collar $r$ or $r^1$ are carried by the post M or $M^1$ and constitute a pair of actuators for the shifting device or lever L, which are movable in different planes to effect the selective and gear-shifting movements of said lever through the connections P and $t$; and that in both embodiments said actuators are moved by a single operating device with which they are connected either by two concentric shafts, as in Fig. 1, or by a single shaft, as in Fig. 10.
While my improved controlling device is especially desirable in connection with the transmission gearing of an automobile, it may be applied to other mechanisms and used for other purposes, if desired.

Various changes or modifications may be made in the device, within the scope of the appended claims; and I do not therefore wish to be limited to the particular embodiments of the invention herein shown and described.

I claim as my invention:—

1. The combination with shiftable members, of a shifting device for said members movable in one direction for selecting the desired member and in another direction for operating the selected member, a post, and a plurality of actuators for said shifting device carried by said post and movable in separate planes transverse to each other, for effecting the selective and operative movements of said shifting device.

2. The combination with shiftable members, of a shifting device for said members movable in one direction for selecting the desired member and in another direction for operating the selected member, a post, actuators for said shifting device carried by said post and movable in different planes, and a single operating device for said actuators.

3. The combination with shiftable members, of a shifting device for said members movable in one direction for selecting the desired member and in another direction for operating the selected member, a post, actuators for said shifting device carried by said post and movable in different planes, and connections between said actuators and said shifting device, the actuators being permanently engaged with the respective connections.

4. The combination with shiftable members, of a shifting device for said members movable in different planes, a post, actuating members for said shifting device, one rotatable and the other slidable on said post, and means for operatively connecting said shifting device with said actuating members.

5. The combination with shiftable members, of a shifting device for said members movable in different planes, a post, actuating members for said shifting device, one rotatable and the other slidable on said post, and a single operating device for said actuating members.

6. The combination of mechanism to be shifted, a shifting device for said mechanism movable in different planes, a tubular post, concentric tubes arranged in said post, one rotatable and the other slidable therein, and means for operatively connecting said tubes with said shifting device.

7. The combination of mechanism to be shifted, a shifting device for said mechanism movable in different planes, a tubular post, concentric tubes arranged in said post, one rotatable and the other slidable therein, means for operatively connecting said tubes with said shifting device, and a single operating device for said tubes.

8. The combination of mechanism to be shifted, a shifting device for said mechanism movable in different planes, a hollow post, concentric tubes arranged in said post, one rotatable and the other slidable therein, means for operatively connecting said tubes with said shifting device, said rotary tube having a fixed arm, and an operating lever fulcrumed on said arm to swing lengthwise of said slidable tube and engaging the latter.

9. The combination of mechanism to be shifted, a shifting device for said mechanism movable in different planes, a hollow post, concentric tubes arranged in said post, one rotatable and the other slidable therein, the rotary tube being provided with a rigid arm and the slidable tube with a grooved shifting collar, a vertically-swinging operating lever pivoted to said arm and engaging said grooved collar, and means for operatively connecting said tubes with said shifting device.

10. The combination with shiftable members, of an actuating device for said members movable crosswise and lengthwise thereof, a shifting lever engaging said actuating device, a post, a rotary shaft journaled in said post, and means for transmitting motion from said shaft to said lever.

11. The combination with shiftable members, of an actuating lever for said members shiftable crosswise thereof, a shifting lever engaging said actuating lever and having a gear segment, a post, and a rotary shaft journaled in said post and having a gear-segment meshing with said lever-segment.

12. The combination with shiftable members, of an actuating lever for said members shiftable crosswise thereof, a post, a horizontally-swinging shifting lever engaging said actuating lever and arranged between the same and said post, said shifting lever having a gear segment, and a rotary shaft journaled in said post and having a gear segment meshing with said lever segment.

13. The combination with shiftable members, of an actuating lever for said members shiftable crosswise thereof, a tubular post, a tube slidable in said post, connections between said tube and said lever for shifting the latter, and means for reciprocating said tube.

14. The combination with shiftable members of an actuating lever for said members shiftable crosswise thereof, a tubular post, a tube slidable in said post, a rock lever arranged in rear of said post, one arm of said lever engaging said slidable tube, and a connection between the other arm of said rock lever and said actuating lever.

15. The combination with shiftable members, of an actuating lever for said members shiftable crosswise thereof, a shifting lever arranged between said post and said actuating lever, engaging the latter and provided at its front end with a gear-segment, a tubular post, concentric tubes arranged in said post, one rotatable and the other slidable therein, the rotary tube having a gear-segment meshing with said lever-segment, a rock lever arranged between said post and said actuating lever and engaging said slidable tube, and a connection between said rock lever and said actuating-lever.

16. The combination with shiftable members of an actuating lever for said members shiftable crosswise thereof and carrying an extended transverse pin, a tubular post, a member slidable lengthwise in said post, a rock lever arranged between said post and said actuating lever and engaging said slidable member, and a rod connecting said rock lever with the transverse pin of the actuating lever.

Witness my hand this 7th day of April, 1908.

ALBERT F. KRAUSE.

Witnesses:
C. F. GEYER,
ANNA HEIGIS.